United States Patent
Kanevsky et al.

(10) Patent No.: US 6,820,096 B1
(45) Date of Patent: Nov. 16, 2004

(54) SMART CALENDAR

(75) Inventors: Dimitri Kanevsky, Ossining, NY (US);
Mariusz Sabath, Scarsdale, NY (US);
Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 09/707,482

(22) Filed: Nov. 7, 2000

(51) Int. Cl.⁷ .............................................. G06F 17/30
(52) U.S. Cl. .................... 707/201; 707/104.1
(58) Field of Search .............................. 707/104.1, 200, 707/201, 8; 700/16, 1; 709/203; 178/18.01, 15; 345/156; 708/112; 705/8

(56) References Cited

U.S. PATENT DOCUMENTS

| | | | | |
|---|---|---|---|---|
| 4,162,610 A | * | 7/1979 | Levine | 368/41 |
| 4,573,127 A | * | 2/1986 | Korff | 700/296 |
| 4,591,840 A | * | 5/1986 | Curtis et al. | 345/156 |
| 4,817,018 A | * | 3/1989 | Cree et al. | 345/751 |
| 4,831,552 A | * | 5/1989 | Scully et al. | 345/751 |
| 4,866,611 A | * | 9/1989 | Cree et al. | 708/112 |
| 5,070,470 A | * | 12/1991 | Scully et al. | 708/112 |
| 5,274,363 A | * | 12/1993 | Koved et al. | 345/2.1 |
| 5,432,571 A | * | 7/1995 | Aoki et al. | 396/318 |
| 5,570,109 A | * | 10/1996 | Jenson | 345/823 |
| 5,864,869 A | * | 1/1999 | Doak et al. | 707/104.1 |
| 5,870,713 A | * | 2/1999 | Haneda et al. | 705/9 |
| 6,064,975 A | * | 5/2000 | Moon et al. | 705/8 |
| 6,088,026 A | * | 7/2000 | Williams | 715/500.1 |
| 6,380,959 B1 | * | 4/2002 | Wang et al. | 345/853 |
| 6,396,480 B1 | * | 5/2002 | Schindler et al. | 345/169 |

* cited by examiner

*Primary Examiner*—Greta Robinson
(74) *Attorney, Agent, or Firm*—Ohlandt, Greeley, Ruggiero & Perle LLP; Daniel P. Morris

(57) ABSTRACT

The idea of this invention is to be able to create an external calendar that is connected to the Internet which can provide instant copies of the calendar, rewrite information on one calendar to another, and create a hassle free way to check calendar dates. One way this is done is by inserting a small digital chip into a calendar which allows the calendar to be connected to the Internet and to perform certain operations. The calendar will have a screen and a special digital pen which allows a user to fill in information (dates, events, appointments) into special date boxes.

7 Claims, 5 Drawing Sheets

SMART CALENDAR

FIELD OF THE INVENTION

The present invention relates to the Internet and more particularly, to integrating with the Internet an optionally designed calendar system.

BACKGROUND OF THE INVENTION

In today's modem world organization is a key. Today, almost everybody owns a calendar that they use for appointments, dates to remember, and important events. Calendars exist everywhere, from computers, to cars, to laptops, to a person's desktop. For people, calendars act as a personal reminder and a daily schedule that they need to follow. The problem that exists with calendars is that most people own a paper calendar that they may put on a desktop or hang on a wall. This poses as a problem when people also have a calendar that they use on their computer, because if a person fills a date in on the computer calendar they have to fill the same information on other calendars so they do not mistake any dates.

Solutions for this problem are, to limit the number of calendars that a person owns or, to just have an Internet calendar that lists all dates and appointments.

The first solution, limiting the amount of calendars a person has, can be very inconvenient for the person, because the person would have to be at a certain point to be able to find out what appointments, meetings or events that person may have to attend. The person may also want to be able to put separate events on separate calendars.

The second solution, putting all events on the Internet, can also be very time consuming and inconvenient for persons to have to log on to the Internet every time they would like to check a date. Also, if the Internet is tied up, they would not be able to go online and check a date.

SUMMARY OF THE INVENTION

Accordingly, it is a primary object of the present invention to achieve convenience for a person desiring to have a calendar and to keep track of all the activities he has planned to attend by selective use of the Internet—rather than being restricted to it and having to log on all the time.

The primary feature of this invention resides in the creation of an external calendar that is connected to the Internet which can provide instant copies of the calendar, rewrite information on one calendar to another, and create a hassle-free way to check calendar dates. This is accomplished by inserting a small digital chip into a calendar which allows the calendar to be connected to the Internet and to perform certain operations. The calendar is provided with a screen and a special digital pen which allows a user to fill in information (dates, events, appointments) into special date boxes.

These date boxes expand when chosen and then they can have information (dates, events, appointments) written within the boxes. The user can write in their normal hand writing style inside the box and then read it later, When the user is done writing within the box, the box contracts into the calendar. The user can also change dates through the Internet Calendars can also be used for methods of expanding and producing a business market; meaning, that if a travel business sees the calendar of a person who is traveling to a foreign country, they can immediately ask to help this person plan his trip. Or, if a person is taking a long road trip, a traffic company may check the time of departure and prepare a traffic report for the person.

If a person owns a paper calendar that is not connected to the Internet in any way, there can be a video camera that will record what the person writes down on that calendar. This will help the person be able to keep track of dates in case something happens to the calendar or for businesses to be able to expand. In order to display on this calendar data that is stored in some other user's computer, calendars one can use a special projector that projects information on the calendar in specified places (like a movie is displayed on a screen). The technique for such projecting on curved restricted area is described in another patent application Ser. No. 09/437,621.

The foregoing and still further objects and advantages of the present invention will be more apparent from the following explanation of the preferred embodiments of the invention in connection with the accompanying drawings.

DESCRIPTION OF PREFERRED EMBODIMENTS

Figure 1:
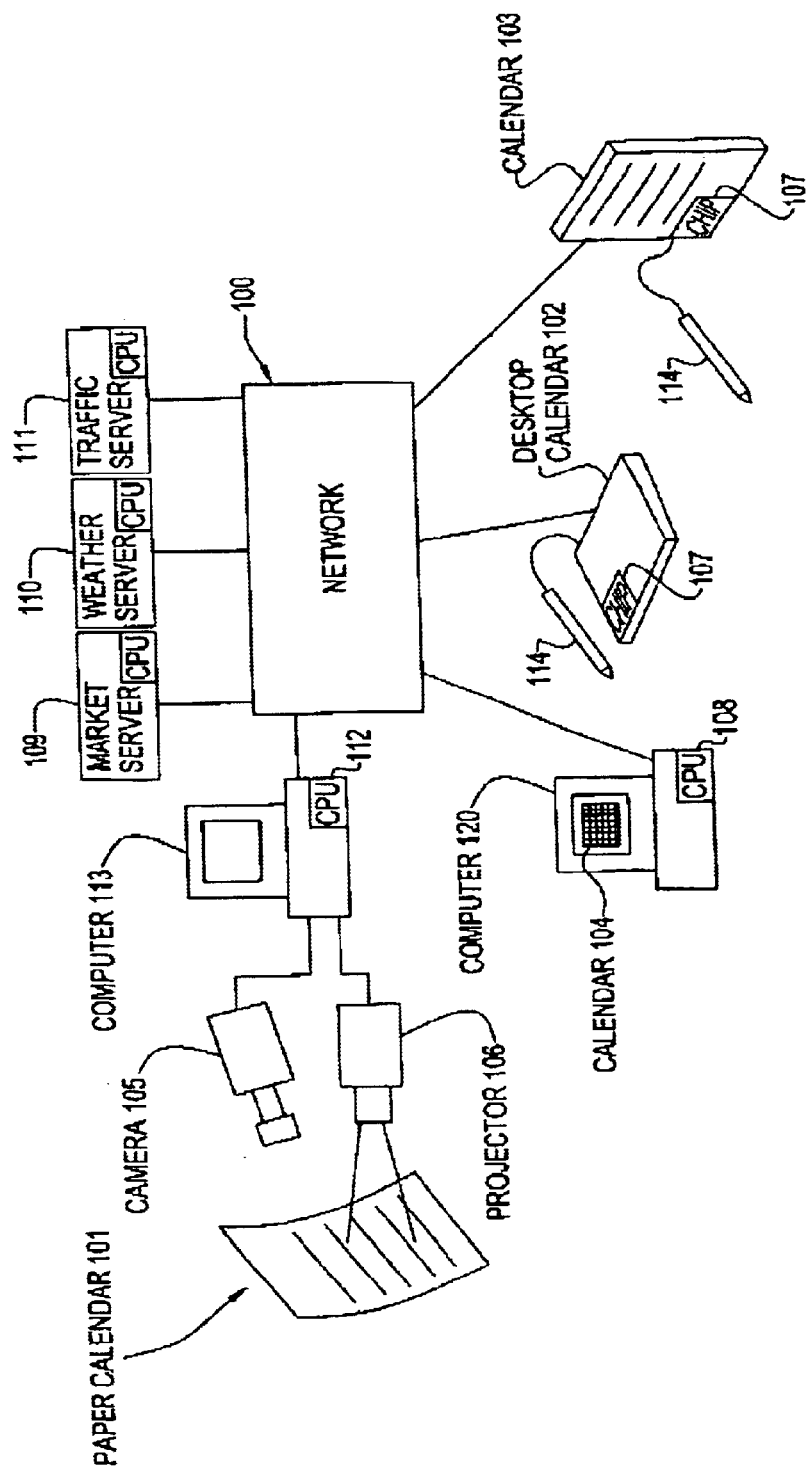
FIG. 1 depicts a system in which the smart calendar is arrayed for operation through a network.

Referring now to FIG. 1, one can see how the smart calendar is used through a network 100. A first calendar, namely paper calendar 101, is provided. Other calendars or second calendars are also provided, as seen in FIG. 1, for example, calendar 102 or calendar 103, or calendar 104, as will be understood by the man skilled in the art. The projector 106 is similar to the type disclosed in Doany U.S. Pat. No. 6,597,410 B1 (Ser. No. 09/437,621 noted above on page 3, last line of the first full paragraph). Pointed at the paper calendar is a video camera 105. Along with the video camera 105, the projector 106 is pointed at the calendar. Light images are projected by projector 106 onto the paper calendar 101, already symbolized by the divergent dotted lines running to the paper calendar 101. The information is captured at the video camera 105, and the information displayed through the projector 108 is sent to the network 100 through a computer 113. A CPU 112 is located within the computer 113 that can perform the following operations: read information and date picked up by the video camera 105; control the projector 106 and display the necessary images; and, finally, control the video camera 105 and make sure it records the necessary information.

Calendar 102 is an example of a desktop smart calendar that includes a chip 107, and a digital pen 114. This calendar is also connected to the network 100. Calendar 103 is the same as calendar 102 that is located on a desktop, but calendar 103 is hung on a wall. Calendar 103 also has a chip 107 and a digital pen 114. The computer which contains the computer calendar is labeled 120. 104 represents a computer calendar. The CPU running in the computer is represented by 108. All of this information that is inputted into the calendars can be viewed, through operation of the projector 106, on calendar 101, when all of the data inputted into the calendars is sent through the network 100, and from the network to computer 113. The network 100 is also connected to servers, such as the market server 109, which scans over all the smart calendars and finds information that could be useful to that company or business. For example, if a child was having a birthday a company that plans birthday parties could make contact or advertise for the birthday child. The network 100 is also connected to a weather server 110, which scans over smart calendars and predicts weather for people who may be traveling on certain dates. The traffic server 111 is also connected to the network. It can scan over smart calendars and show traffic for areas that people may be traveling through and be able to pick the best route for the people to use to have a shorter trip.

Figure 2:
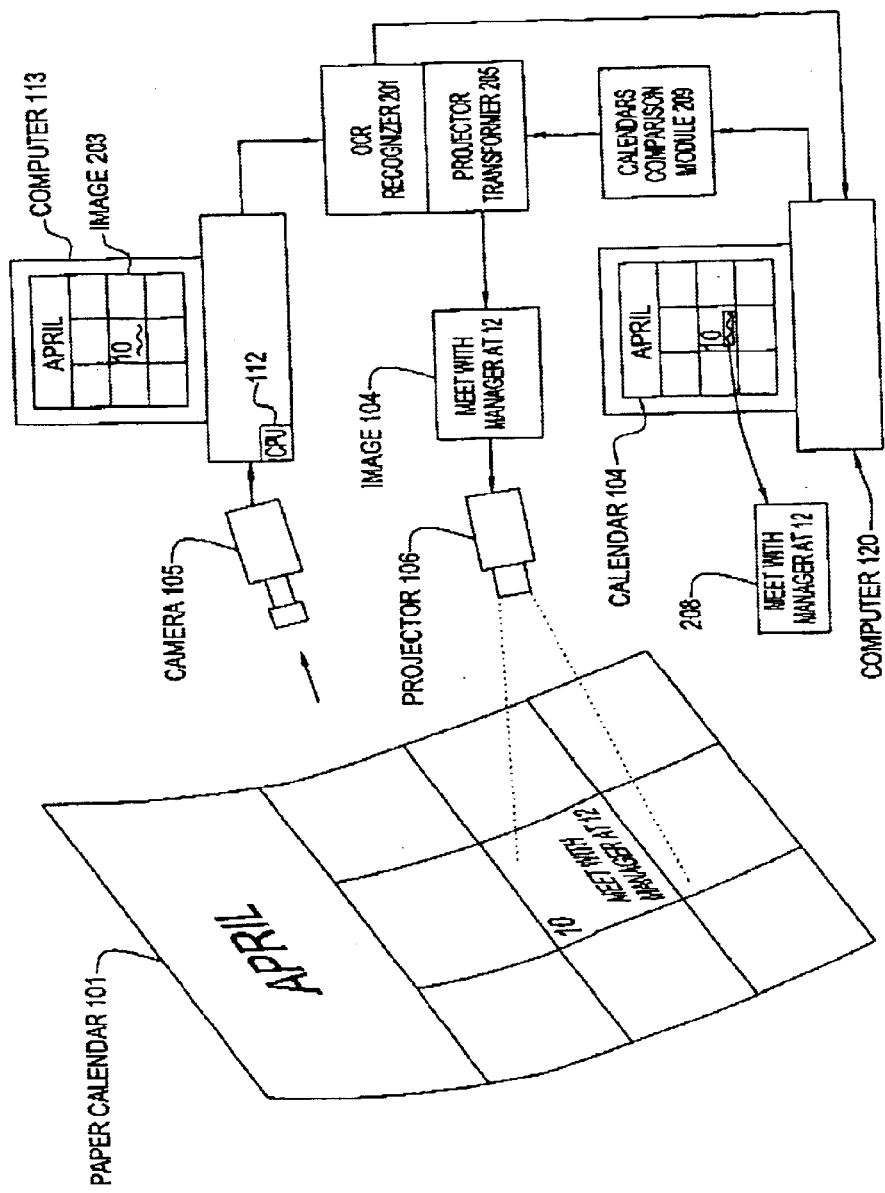
FIG. 2 depicts how the cameras work when they capture the image of the calendar.

Referring to FIG. 2, one can appreciate how the cameras work when they capture the image of the calendar 101. The image of the calendar 101 is picked up by the camera 105. The camera then sends the image to the CPU 112 of computer 113, which displays on its screen the image 203. The Optical Character Recognizer (OCR) 201 connected to computer 113, recognizes character data and transforms them in some digital format (e.g. ASCII). For example, it sees that on the calendar page there is displayed "APRIL".

After the OCR produces ASCII string (APRIL), it is compared with data that is stored in a user's other calendar, for example, Calendar 104, that is located in some other computer 120. The calendars comparison module 209 (see FIG. 2) is responsible for comparing calendars to find the same date. For example, calendar 101's dates are compared to calendar 104's dates and the information is combined. As shown in 208, calendar 104 of computer 120 indicates that on April 10$^{th}$ "meet with manager at 12". The calendar's comparison module 209 transforms data from the calendar 104 of computer 120 and combines it with the data already present on calendar 101. The combined image is then sent by way of transformer 205 to the projector 106, where it is projected onto and displayed on Calendar 101.

Figure 3:
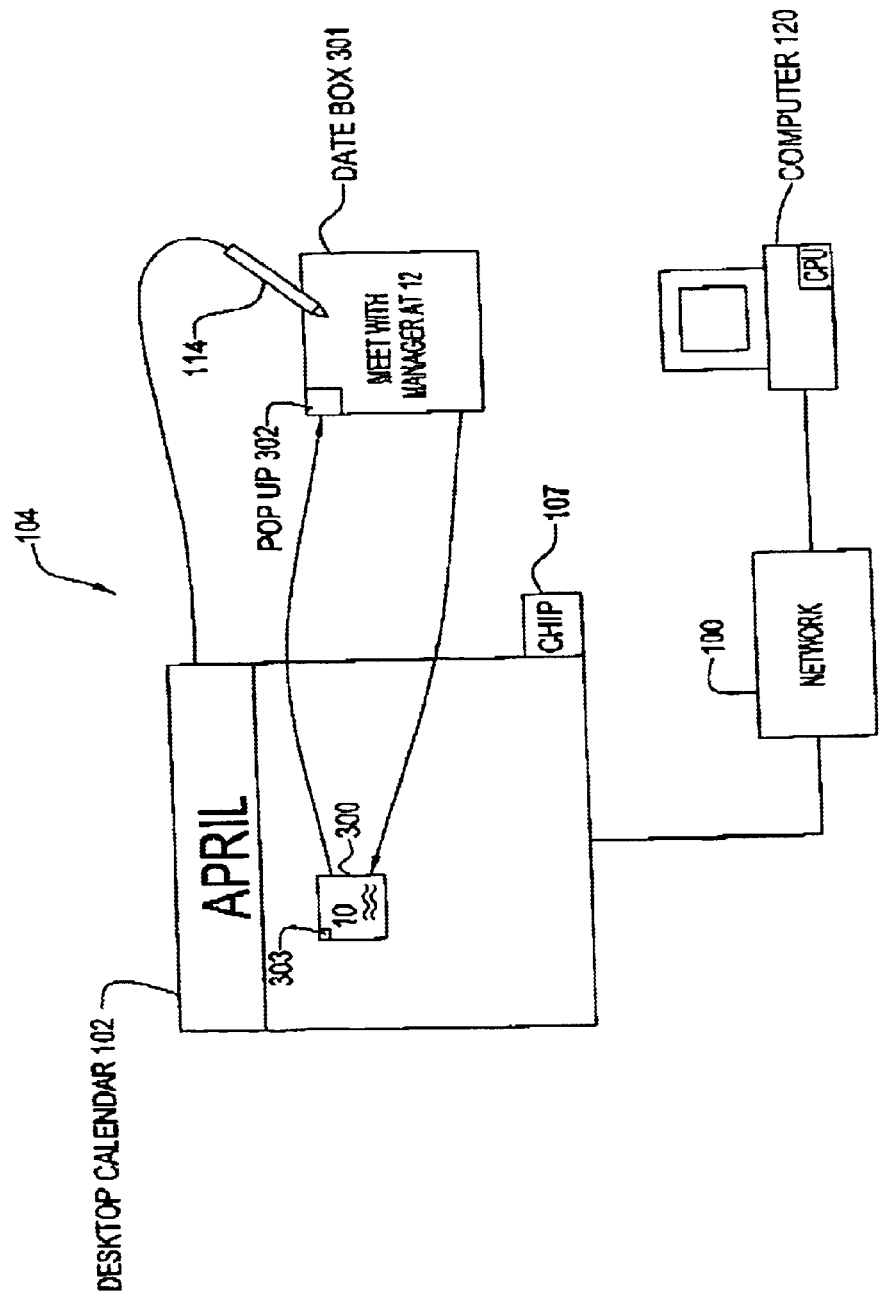
FIG. 3 depicts how information is inputted into a desktop calendar using a digital pen.

Referring to FIG. 3, it will be understood how information is inputted into a desktop calendar using a digital pen. On a calendar 102 that contains a chip 107, digital pen 114 can be used to input information into the calendar. A person would go over to the desired date box 300 with their digital pen and tap the corner 303 of the date box. In this example, the person has highlighted April 10$^{th}$, 300. The chip 107 is responsible for making a date box enlarge when chosen. This is done so it is more convenient for the person to write their schedule for that date. 301 represents the enlarged form of the date box. Now, the person is free to write whatever they please in the box. When done writing the person hits the upper left corner 302 to make the box go back to its original size. The desktop calendar 102 is connected to the network 100 which is connected to other smart calendars or, as seen, to another computer 120 in the home. The handwriting can be read by a handwriting recognition system or it can read the other smart calendar in the household. Another way to input information into the desktop calendar 102 is to use a computer with a calendar that is connected to the desktop calendar 102. Then, using a telephone, one would dial up a telephone at the location of the desktop calendar 102, thereby allowing the user to input information from another location.

Figure 4:
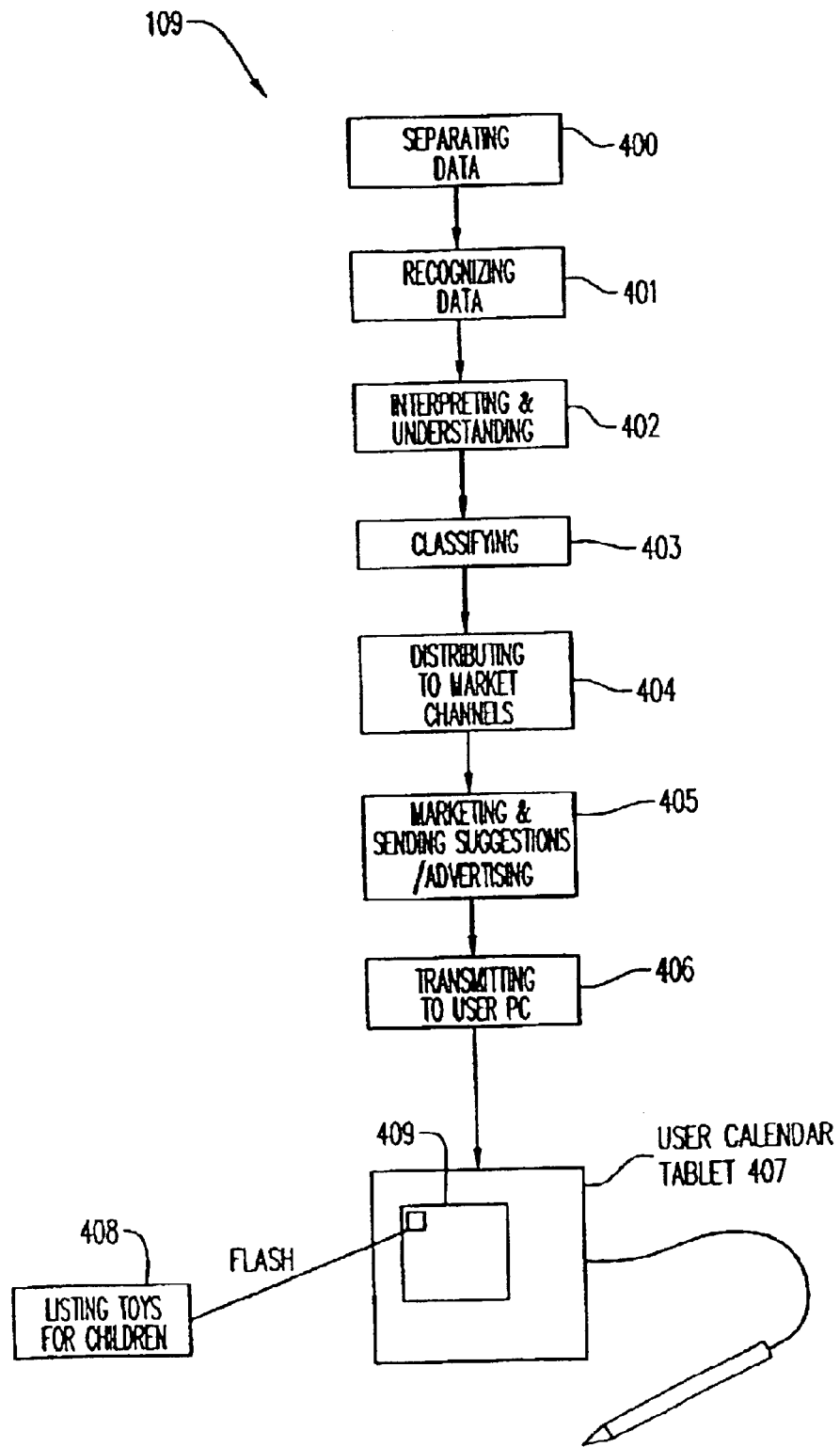
FIG. 4 is a flow chart which depicts the operations that the CPU performs in the market server.

In FIG. 4, operations that the CPU performs in the market server are shown by means of a flow chart. The block 400 functions to separate data being sent from the calendar to the market server. 401 depicts the process of recognizing the data using either Automatic Handwriting Recognition or OCR which is another similar reference 402, by which data is then interpreted/understood after being recognized, using basic modem technology. For example, if it is read that a child s having a birthday, a computer can interpret that. But, if there is just an abbreviation for the birthday, a list is set up of all possible abbreviations for birthday. Operation 403 provides the classification called for. All the data that is entered is classified into their appropriate folders, (operation 404); this data is distributed to different marketing channels and businesses which go over the data and then send suggestions/advertisements to the user (405). By operation 406 the data sent from markets is received by a computer linked to the smart calendar 407 or, to the most used computer. This information could appear as a small addition to the calendar, such as a blinking message. To do this, a date box is highlighted and then the data is entered (407). When opened, the advertisement given by the company is shown (408).

Figure 5:
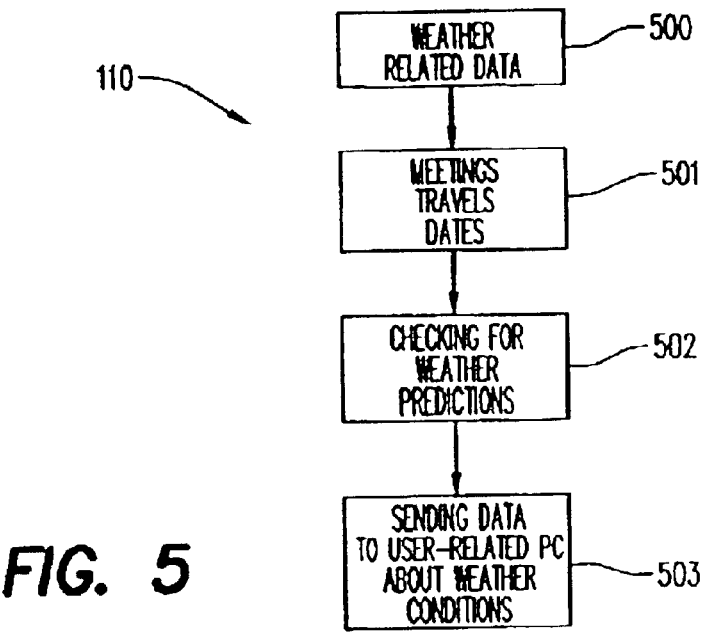
FIG. 5 is a flow chart explaining the function of the weather server.

FIG. 5 is a flow chart explaining the function of the weather server 110. If the inputted data in a calendar is classified as a trip of some sort, the data may be sent to a weather server. By operation or step 500, weather related data is sent to the weather server. The date and time of the trip is documented and then checked (501). The weather is checked and if it may be hazardous or interfere with set plans, it is noted (502). The data about the weather for the scheduled date is then sent to the user's calendar or PC (503).

Figure 6:
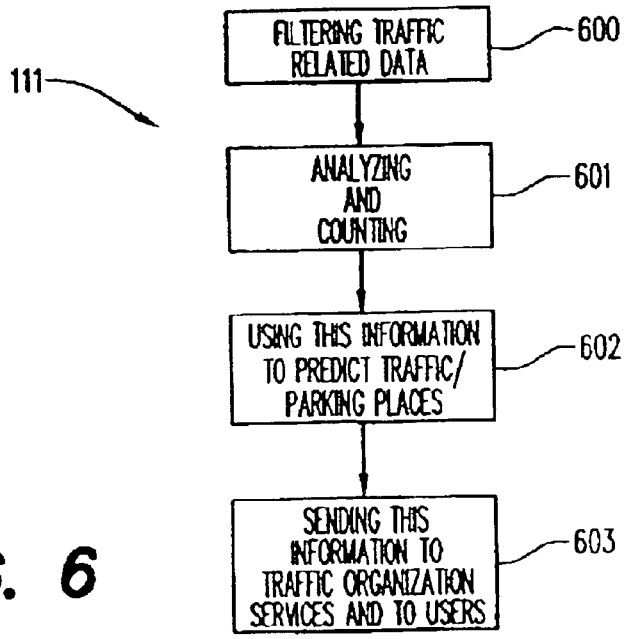
FIG. 6 is a flow chart that depicts how the traffic server functions on the smart calendar.

FIG. 6 is a flow chart that describes how the traffic server 111 functions on the smart calendar. By step 600, traffic related data is filtered from all the data on the calendar. By step 601, the data is analyzed and counted. For example, a check is made on how many people may be heading to a certain area, such as a city, movie theater, or even restaurant. This data is then used to predict the traffic and possible parking problems (602). By step 603, this data is finally sent to traffic organization services and to users who will be traveling on the mentioned dates.

The invention having been thus described with particular reference to the preferred forms thereof, it will be obvious that various changes and modifications may be made therein without departing from the spirit and scope of the invention as defined in the appended claims.

We claim:

1. A calendar system connected to a network comprising:

a first calendar, formed of light-image-responsive material, and a second calendar;

a video camera and a projector of light images pointed at the first calendar;

means for sending the data displayed on the first calendar to the second calendar or data displayed on the second calendar to the first calendar, wherein the system displays on the first calendar the data stored in the second calendar via the projector, and the system displays on the second calendar the data stored in the first calendar via said video camera;

a computer for comparing the contents of the first calendar and the second calendar and for filling them with data missing from either, such that both the first calendar and second calendars are able concurrently to display altogether the same data.

2. A calendar system as defined in claim 1, in which the computer for comparing the contents includes means for recognizing and interpreting the fast calendar's content, wherein the system displays on the first calendar the data that is stored in the second calendar, if such data is not displayed already on the first calendar.

3. A system as defined in claim 2, further including a third calendar having a screen, and an input means in the form of a digital pen wherein what is written on the third calendar by the digital pen is sent to the first and second calendars.

4. A system as defined in claim 3, wherein the third calendar includes a digital chip for connection to the internet.

5. A system as defined in claim 1 in which the video camera captures the image of the first calendar, means connected to the first calendar for sending the image to the computer OCR for recognizing character data and transforming such into a digital format, wherein said OCR produces a string of data that denotes a particular date; means for comparing data stored in the second calendar located in another computer and having the same date; means for comparing the calendar content to find the same date; means for combining the information responsive to the dates having been compared.

6. A system as defined in claim 5, further including a projector transformer which transforms data on the computer's calendar and adjusts it to an image, and means for transforming the image and sending it to the projector so that it is displayed on the first calendar.

7. A system as defined in claim 1 further including a third, desktop calendar having a digital chip means and a digital pen, the digital pen being used to input information into the third calendar; the third calendar having a date box which is adapted to be enlarged responsive to the tapping of a corner thereof, the chip means being responsive to the tapping of the date box for enlarging that date box.

* * * * *

Disclaimer

6,820,096 B1 — Dimitri Kanevsky, Ossining, NY (US); Mariusz Sabath, Scarsdale, NY (US); Alexander Zlatsin, Yorktown Heights, NY (US). SMART CALENDAR. Patent dated Nov. 16, 2004. Disclaimer filed Oct. 5, 2006, by assignee, International Business Machines Corporation.

Hereby enter this disclaimer to all claims of said patent.

*(Official Gazette, April 22, 2008)*